July 29, 1952   M. H. MAURER ET AL   2,605,171
APPARATUS FOR ACID SLUDGE DECOMPOSITION
Filed Dec. 22, 1949   3 Sheets-Sheet 3
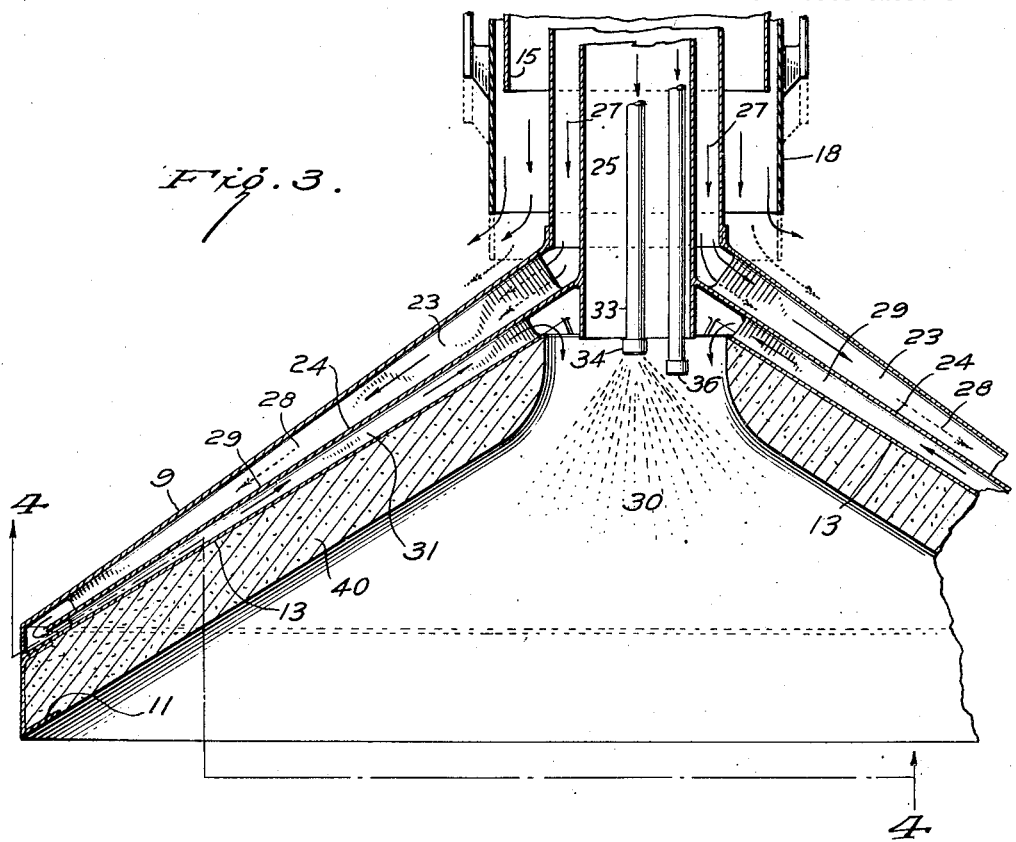
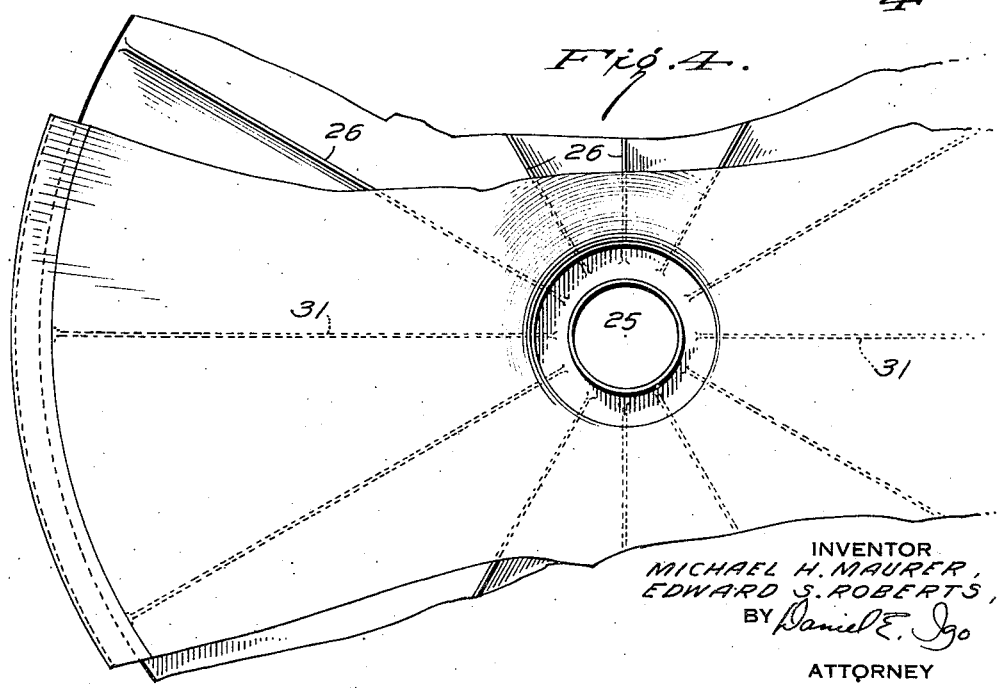
INVENTOR
MICHAEL H. MAURER,
EDWARD S. ROBERTS,
BY Daniel E. Igo
ATTORNEY Patented July 29, 1952

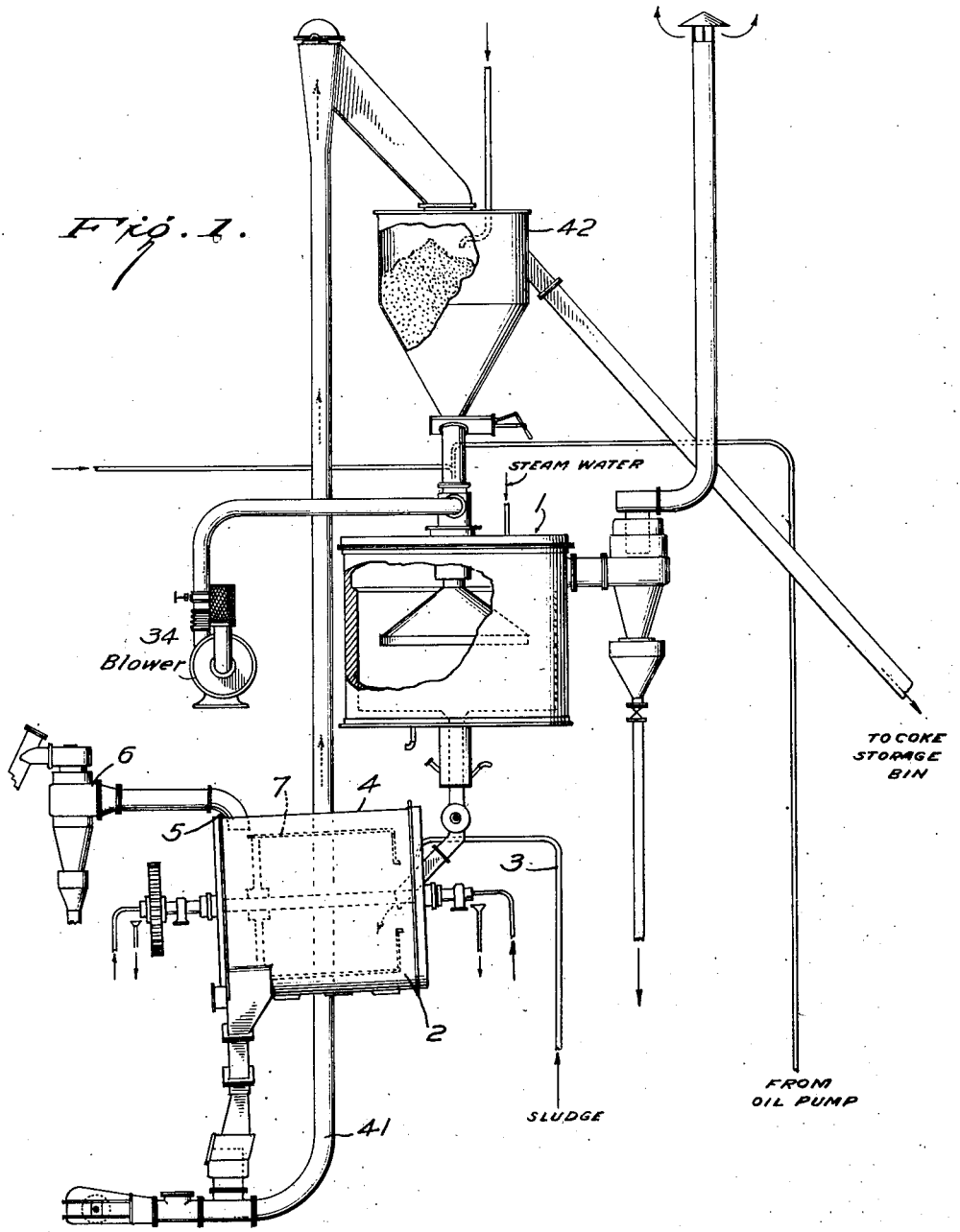

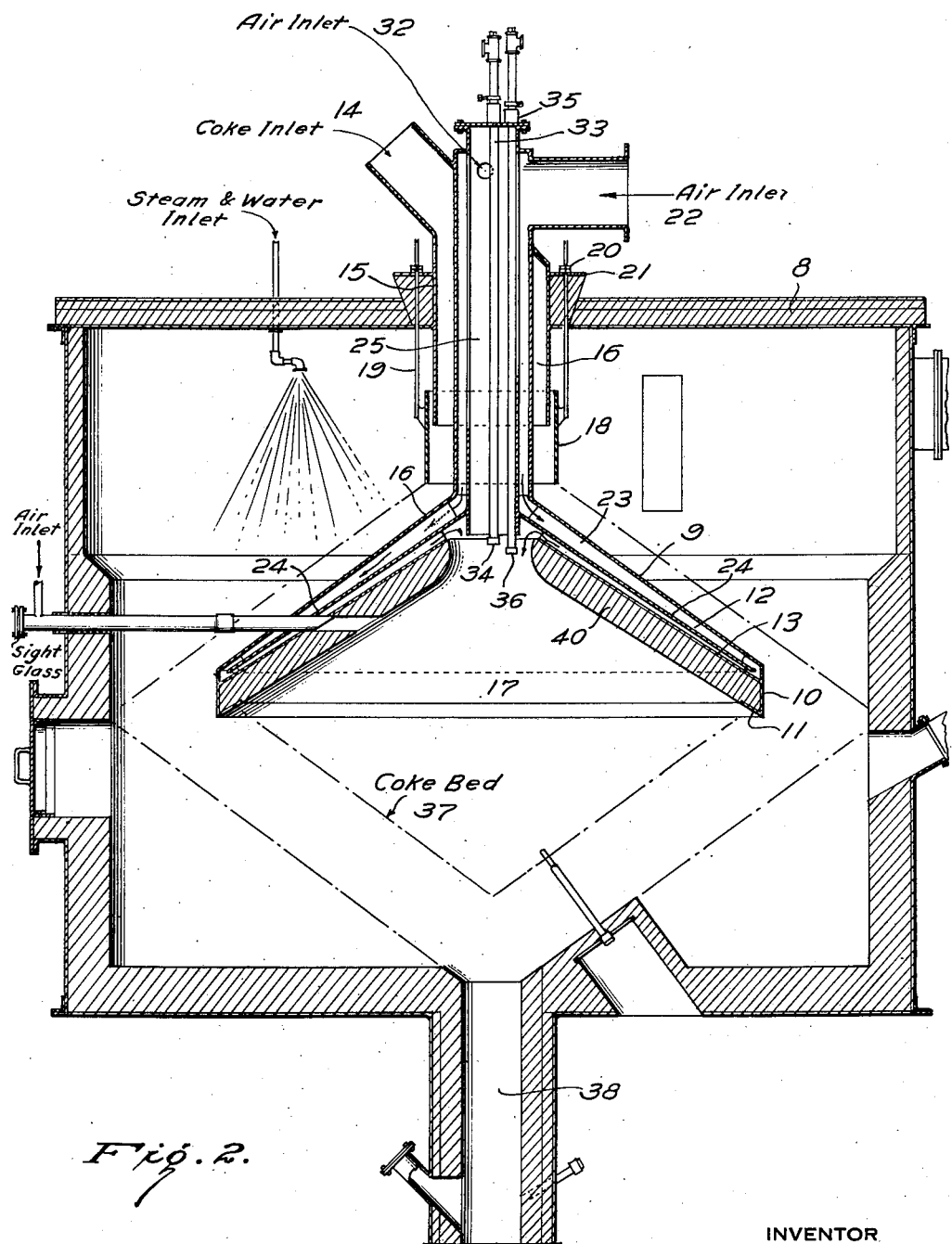

2,605,171

UNITED STATES PATENT OFFICE 2,605,171

APPARATUS FOR ACID SLUDGE DECOMPOSITION

Michael H. Maurer, Miami, Ariz., and Edward S. Roberts, New York, N. Y., assignors to Chemical Construction Corporation, New York, N. Y., a corporation of Delaware Application December 22, 1949, Serial No. 134,404

4 Claims. (Cl. 23—279)

This invention relates to a method and apparatus for the production of sulfur dioxide from acid sludge and more particularly from the acid sludge resulting from the sulfuric acid purification of petroleum hydrocarbons. More specifically, this invention relates to the thermal decomposition of acid sludges such as result from the sulfuric acid refining of petroleum hydrocarbons or other hydrocarbons containing unsaturated compounds which can be removed by agitation with sulfuric acid.

The thermal decomposition of such sludges is highly desirable in order to convert the sulfuric acid, and various sulfur compounds contained in said sludges, to sulfur dioxide of such a nature that it is capable of being economically converted into sulfur trioxide which is absorbed to form sulfuric acid. The sulfuric acid so produced is the usual commercial grade, capable of being utilized in oil refining or any other channels of commerce.

The thermal decomposition of petroleum acid sludges to produce sulfur dioxide is well known in the art. It is known that these said sludges are decomposed by passing acid sludge through a rotary kiln in countercurrent contact with heating gases, the kiln temperatures being carefully controlled in a plurality of heating zones. Commercial use has shown that this process is highly successful with acid sludges having a relatively low free hydrocarbon content, but with sludges of higher oil content the heating gases are so diluted by additional steps necessary to remove the oil that only a relatively weak sulfur dioxide gas is obtained.

In order to render the above-iterated sludge decomposition process adaptable to high oil sludges, the art teaches the use of hot, non-gaseous material as a heating medium, and preferably, hot, finely-divided solids. Accordingly, a method was developed in which acid sludges of relatively high oil content were intimately mixed with hot sand or other hot, non-gaseous heating material in a rotary kiln, the heat of the sand being transferred to the sludge by reason of its intimate admixture therewith, and the non-volatile constituents of the sludge being transformed into coke. The details of this method are found in United States Patents 2,028,713 and 2,028,725.

The art has taught that non-gaseous or solids heating medium is usually heated in an elongated rotary kiln to a temperature of about 1600° F. In this method the solid coke-like residue resulting from the decomposition of the acid sludge is employed as fuel for obtaining the high temperatures required in the solids heating kiln. This decomposition coke may be elevated from the sludge decomposition kiln outlet through an elevator and conveyor line to a hopper from which it is fed into the fuel inlet end of the solids heating kiln.

The present invention is an improvement in the method and apparatus of thermally decomposing acid sludges which results in the improved behavior of the sludge during the decomposition. Further, the process hereinafter described makes possible the production of sulfur dioxide gas practically free of non-condensable hydrocarbons.

Heretofore, the non-gaseous or solids heating material used to decompose the sludge was heated in an elongated rotary kiln to a temperature of approximately 1600° F. The granular solid heating material is discharged from the separate heating kiln through an outlet pipe at a temperature which may range from 1200° to 1600° F. A feeding mechanism, capable of discharging the heated solids at a predetermined rate through a gas tight seal, is generally provided in this pipe, preferably in the form of a plunger feeder operated by a driving mechanism. The operation of this plunger feeder introduces a stream of the hot granular solids into a sludge decomposition kiln.

The art has further taught that the basis of known processes for the decomposition of acid petroleum sludges is the intimate admixture of acid sludge with a stream of hot, non-gaseous heating material, which is heated to a temperature of approximately 1500° F. This extremely high temperature is necessary in order to introduce the required number of heat units into a rotary kiln, while maintaining a reasonably high ratio of acid sludge to heating material, and such temperatures produce the best results in large-scale operations. It is also known that if fresh acid sludge is permitted to remain in intimate contact with solids heated to such high temperatures for any length of time, a substantial proportion of the hydrocarbon oil content of the said sludge will be cracked into hydrocarbons of much lower molecular weight. Most of these cracked hydrocarbons are permanent gases at atmospheric temperatures and can only be removed from the sulfur dioxide gases by combustion in a secondary furnace. This, obviously, increases the percentage of inert constituents in the resulting purified sulfur dioxide gas and requires a larger sulfuric acid plant to make the same amount of sulfuric acid from such gas.

The term "acid sludges," as used in this specification, means sulfuric acid that has already been utilized in the purification of petroleum or any other hydrocarbon oils. Petroleum or hydrocarbon oils contain a certain amount of unsaturated compounds, which upon the combustion of said oils or hydrocarbons form degradation products in the nature of a tarry mass or sludge. These unsaturated compounds can be removed from the said oils by means of treatment with sulfuric acid, which is well known in the art. The sulfuric acid that has been used in such petroleum purification processes is known as "sludge acid." The composition of acid sludges is variable to quite a large degree. However, it may be said that petroleum acid sludges usually contain approximately 70% sulfuric acid plus saturated and unsaturated organic compounds as such, organic sulfur compounds, and the like.

Acid sludges of the above composition obviously cannot be disposed of in the usual manner. Stream and atmospheric pollution are but a few of the problems that have been created in an attempt to dispose of the said sludges. Hence, it is economically highly desirable to recover the sulfuric acid contained in said sludges and to convert the carbon content of the same to coke, which can be disposed of very readily; or, as this invention teaches, re-used in the decomposition process as a heat transfer medium.

The term "sludge coke," as it appears herein, means the coke or carbon that is produced as a result of the decomposition of all the carbon compounds contained in the acid sludge.

This invention has as its object the decomposition of acid sludges to such an extent that all the hydrocarbons present in the sludge are decomposed to form a coke suitable for re-use in the process as a heat-transfer medium. A further object is the provision of a sludge decomposition apparatus that is of simplified design and generally more economical to construct and operate. A still further object of this invention is to provide a continuous method for thermally decomposing petroleum acid sludges, wherein is embodied a new and improved means of heating the solid transfer medium. A still further object of this invention is the provision of a new and improved apparatus for the decomposition of sludges, wherein the said apparatus embodies a new and improved solids heater retort for supplying hot granular solids to a sludge decomposition kiln. Other objects will be apparent from the detailed description of the invention hereinafter set forth.

With the above and other objects in view, this invention consists in the combination and association of parts as will be more specifically pointed out in the hereinafter detailed description thereof, reference being made to the acompanying drawing.

In the drawings:

Figure 1 is a diagrammatic elevation partly in section of an acid sludge decomposition plant embodying a solids heater retort in combination with a rotary sludge decomposition kiln.

Figure 2 is a vertical section of the solids heating retort.

Figure 3 is a vertical section of the conical solids heating mechanism.

Figure 4 is a bottom plan view partly in section in the direction of the arrow 4 of Figure 3.

Referring to Figure 1, the general combination of the apparatus shown in somewhat diagrammatic form illustrates one type of commercially successful plant in which the improved solids heater retort, constituting the present invention, may be installed with considerable advantage. However, it should be clearly understood that the invention in its broader aspects is not limited to this particular type of plant. The acid sludge decomposition plant illustrated in this figure consists generally of a solids heater retort 1, constituting an embodiment of the present invention together with a sludge kiln 2 and the necessary additional piping and conveyors to complete the process.

It should be understood that acid sludges from various sources have diverse physical as well as chemical characteristics, but that all such sludges can be heated with suitable steam coils to a degree sufficient to impart fluidity without decomposition. The sludge to be treated is made fluid in suitable tanks wherein the sludge material is circulated and continuously withdrawn by means of pumps and fed to the sludge decomposition kiln 2 through the sludge feed line 3, wherein the said sludge is thermally decomposed to produce principally sulfur dioxide gas.

The sludge decomposition kiln consists generally of a cylindrical shell 4 provided with an inner heat-resistant lining of ceramic material or the equivalent. The cylindrical shell is provided with annular supporting rails and through which its weight is transmitted to pairs of suitably mounted supporting rollers. The said kiln is mounted on a slight angle so that the coke resulting from the decomposition of the acid sludge and the solid non-gaseous heat transfer material will flow to the discharge end of the kiln where it is removed for reheating and subsequent use as the solids heating medium. The said kiln is provided at its top with a gas outlet line 5 leading to a cyclone gas separator 6.

In addition, the sludge decomposition chamber is provided with a cylindrical cage 7 in order to obtain the optimum of admixture of the acid sludge with the solids heating medium. This cage is substantially smaller in diameter than the interior of the kiln in which it is mounted. The said cage is also slightly shorter in length than the internal length of the said kiln, and it is therefore free to roll as the kiln is rotated. This cage is of a construction especially adapted to provide a general kneading of the acid sludge with the solid heating mixture and is more specifically described in U. S. Patent 2,144,251.

The acid sludge is thermally decomposed in the decomposer kiln by means of heat that is supplied through a solids heat transfer medium, e. g., coke, sand, and the like. It is preferred that the coke resulting from the sludge decomposition be used as the heating medium. This decomposition coke is discharged from the decomposing kiln into a suitable conveyor by means of which it is conveyed to the solids heater retort hopper or an auxiliary coke storage bin. The coke is allowed to flow from the said hopper into the said solids heater retort hereinafter described in detail and wherein the coke is heated to a temperature of from 1200° F. to 1800° F. and fed to the sludge decomposing kiln to effect the thermal decomposition of the acid sludge.

Referring to Figure 2 and Figure 3, the solids heater retort generally consists of an insulated shell 8, having a centrally suspended, right-angular, hollow frustum conical structure 9, the said conical structure having a downwardly extending skirt 10 about the periphery of the base of the said conical structure, said skirt having an inwardly extending flange 11.

The said conical structure contains two rib supported superimposed interior baffles 12 and 13 respectively about the interior slant height of said conical structure for leading the combustion supporting gases into the combustion zone 30.

The said retort is provided with a solids inlet means 14 which consists of a cylindrical pipe leading to the top of the cone 9 and supported by the upper section of the retort shell at 15 and providing an annular space 16 through which the solids heat transfer medium passes to the heating area of the retort 17. The solids inlet means is provided with an adjustable skirt 18, which can be raised or lowered by means of the rods 19, which are manipulated, i. e., raised or lowered, by means of suitable nuts 20, operated on the threaded ends of the said rods 19. The said solids inlet means 14 and the adjustable skirt are mounted on the frame or lug 21 which is integral to the upper part of the retort shell 8.

The conical structure 9 is attached to and made integral with a combustion air inlet means 22 which extends downward through the solids inlet pipe 14 so as to form the aforesaid annular space 16 between the combustion air inlet line 22 and the solids inlet means 14. The opening at the apex of the cone 9 is attached to the air inlet means 22 so as to allow the incoming combustion air to flow inside the cone 9 and into the annular cone space 23 which is formed by the baffle 24 which is attached to a cylindrical port 25, which extends downwardly through the combustion air inlet means 22. The baffle 24 is supported by annular ribs 26 attached to the interior slant height surface of the cone frustum 9 and by being secured to the port 25. The combustion air flows through the annular space 27 into the interior conical annular spaces 28 and 29 respectively, and thence into the combustion zone 30. The aforesaid annular interior conical space 29 is formed by the baffle 13 which is secured or mounted by means of the annular ribs 31 attached to the baffle 24. The said annular spaces 23 and 29 are completely formed within the interior of the cone by means of a downwardly extending skirt 10 which circumscribes the periphery of the cone 9, and which contains an inwardly extending section or flange 11. The cylindrical port 25 is provided with an auxiliary air inlet means 32 and a combustible fuel line 33, having a burning nozzle 34 located at the end of said fuel line and extending into the combustion zone 30. The cylindrical port 25 provides an annular space which leads directly into the aforesaid combustion zone. The said port 25 is sealed at its uppermost end by a suitable cover plate 35. Also provided in the said annular space 25 is an auxiliary or starting-up pilot burner 36 which acts in the nature of a pilot flame to ignite the combustion gases from the main burner nozzle 34.

The aforesaid structure provides a unit of apparatus whereby a solids heating medium flows through the annular space 16 onto the surface of a cone frustum 9 so as to form a solids bed 37. The solids heat transfer material flows from the said bed into the retort exit line 38, which conducts the said material to the decomposition kiln 4. Combustion supporting gas or air is fed into the retort through the annular space 22 into the interior of the said cone 9 and through the conical annular spaces 23 and 29 provided by the baffles 24 and 13 respectively, and then into the combustion zone 30 wherein the gas acts as a support for a combustible fuel supplied through pipe 33 to the burning nozzle 34.

The conical baffles 13 and 24 are adapted so as to provide the aforesaid interior conical annular spaces from frustum vertex to the internal base periphery to provide a decreasing conical annular space and from the said periphery annularly back to the vertex in a reverse manner to the combustion zone so as to provide decreasing and increasing annular conical spaces, respectively, substantially as shown. The degree of taper in the conical baffles is so adjusted to provide a slightly turbulent air flow at the internal periphery of the cone so as to maintain the said flow constant at a given rate. This factor is dependent upon the size and design of the retort, the amount of back pressure upon the unit, and the like. The combustion supporting air or gas is supplied to the retort by means of any suitable air blower 34. The interior conical surface of the baffle 13 is provided with a suitable layer of heat resistant insulation 40. This layer of insulation may be of any thickness depending upon the type of insulating material that is utilized and the degree of insulation that is required. This insulation should be of such a degree as to effect a radiation of substantially all the heat of combustion onto the solids bed 37.

The combustion supporting gas that flows along the interior surface of the retort cone consequently is preheated prior to entering the combustion zone as well as effecting a heat transfer from the cone material to the gas which in turn eliminates excessive cone material temperatures which may tend to distort the conical structure.

It has been found that this type of solids heating retort is particularly adapted to heating as a solids heat transfer medium, the coke that is formed as a result of the thermal decomposition of the acid sludge.

The coke that is formed in the sludge decomposition kiln 4 is conveyed by means of the elevator 41 to the coke heater retort bin 42.

It has been found that the decomposition coke formed in this process is a hard, dense, granular coke varying in size from 2 mesh to 10 mesh granular. This coke possesses the additional desirable property of being capable of fluidized solid flow. This fact alone eliminates the disadvantage that is encountered when sand, porcelain or metallic balls, and the like are used. Namely, that the decomposition coke formed does not adhere to any independent heat exchange medium, and thus materialy lower the efficiency of the same.

In actual operation of this process it was found that from 8,000 pounds to 10,000 pounds per hour of acid sludge containing 50 to 65% $H_2SO_4$ could be converted to a gas comprising approximately 80% sulfur dioxide, 4–9% $CO_2$, 1 to 2% oxygen and 2.5% nitrogen and combustibles. In order to produce the gas it was found that a coke level of approximately 6 inches on the retort cone was optimum in conjunction with a retort combustion zone temperature of from 1500° F. to 1800° F.

The heat resulting from the burning of a combustible fuel such as natural or manufactured gas and oil in the presence of air was imparted to the flowing coke bed by means of radiation, conduction and convection so as to give maximum heat transfer. The aforesaid solids heater retort conditions permitted solid granular coke as a heat transfer medium to enter the sludge decomposition kiln at a temperature between 600° F. and 800° F. The temperature of the solids coke at the decomposer kiln exit was 350° F.

The coke flow through the solids heater retort will to some degree determine the temperature of the coke leaving the heater retort. This temperature is also controlled by the amount of air that is burned in conjunction with the fuel. By increasing the air to fuel ratio the temperature of the coke can be increased by actually burning a part of the coke.

By increasing the depth of the coke bed on the retort cone 9 by means of the adjustable skirt 18, increases the heat transfer efficiency of heat of combustion into the solid coke by allowing more contact time between the combustion gases and the coke. This depth of coke bed also increases the back pressure upon the system. Therefore, each unit of apparatus should be operated in view of design, capacity, type of acid sludge being decomposed, and the like.

It is apparent that many widely different variations and embodiments of this invention may be accomplished without departing from the scope and spirit thereof, consequently the scope of the subject invention should not be construed as limited by the specific embodiment contained in this specification, but instead by the scope of the hereinafter appended claims.

What we claim is:

1. An apparatus for the thermal decomposition of acid sludges which comprises a rotary kiln, means for feeding acid sludge into said kiln, a means for introducing hot, granular, heat-transfer material into said kiln, a cylindrical cage in said kiln which is substantially smaller in diameter than the interior of the kiln and which is free to roll therein as the said kiln is rotated in combination with a solids heater retort which comprises an outer retort shell, the said shell having an internally centrally suspended, right-angular, hollow frustum conical structure containing two separated ribs supported superimposed interior conical baffles about the internal slant height of said conical structure, a vertical adjustable skirt surmounting the vertex of said conical structure, a means for introducing relatively cold solids into the said shell and upon the outside slant height surface of said conical structure, a means for introducing a combustible fuel and a combustion supporting gas into the said retort shell and into the interior of the vertex of the aforesaid conical structure, a means for burning the said combustible fuel inside the hollow conical structure and a means for discharging the heated solids from the said retort shell.

2. An apparatus for the thermal decomposition of acid sludges which comprises a rotary kiln, means for feeding acid sludge into said kiln, a means for introducing hot, granular, heat-transfer material into said kiln, a cylindrical cage in said kiln which is substantially smaller in diameter than the interior of the kiln and which is free to roll therein as the said kiln is rotated in combination with a solids heater retort which comprises an outer retort shell, the said shell having an internally centrally suspended, right-angular, hollow frustum conical structure having a downwardly extending skirt about the periphery of the base of said conical structure and containing two separated rib supported superimposed conical baffles about the interior slant height of said conical structure whereby is formed two conical annular spaces about the interior slant height of said cone from the vertex to the internal base periphery and which respectively taper from the cone vertex and from the base periphery of said cone, a vertical adjustable skirt surmounting the vertex of said conical structure, a means for introducing relatively cold solids into the said shell and upon the outside slant height surface of said conical structure, a means for introducing a combustible fuel and a combustion supporting gas into the said retort shell and into the interior of the vertex of the aforesaid conical structure, a means for burning the said combustible fuel inside the hollow conical structure and a means for discharging the heated solids from the said retort shell.

3. A solids heater retort comprising an outer retort shell, the said shell having a centrally suspended, right-angular, hollow frustum conical structure containing two separated rib supported superimposed interior conical baffles about the interior slant height of said conical structure, a vertical adjustable skirt surmounting the vertex of said conical structure and supported by the said retort shell, a means for introducing relatively cold solids into the said shell and upon the outside slant height surface of said conical structure, a means for introducing a combustible fuel and a combustion supporting gas into the said retort shell and into the interior of the vertex of the aforesaid conical structure, a means for burning the said combustible fuel inside the hollow conical structure and a means for discharging the heated solids from the said retort shell.

4. A solids heater retort comprising an outer retort shell, the said shell having a centrally suspended, right-angular, hollow frustum conical structure having a downwardly extending skirt about the periphery of the base of said conical structure and containing two separated rib supported superimposed conical baffles about the interior slant height of said conical structure whereby is formed two conical annular spaces about the interior slant height of said cone from the vertex to the internal base periphery and which respectively taper from the cone vertex and from the base periphery of said cone, a vertical adjustable skirt surmounting the vertex of said conical structure and supported by the said retort shell, a means for introducing a combustible fuel and a combustion supporting gas into the said retort shell and into the interior of the vertex of the aforesaid conical structure, a means for burning the said combustible fuel inside the hollow conical structure and a means for discharging the heated solids from the said retort shell.

MICHAEL H. MAURER.
EDWARD S. ROBERTS.

REFERENCES CITED

The following references are of record in the file of this patent:

UNITED STATES PATENTS

| Number | Name | Date |
|---|---|---|
| 1,918,377 | Buchner | July 18, 1933 |
| 1,996,649 | Puening | Apr. 2, 1935 |
| 2,012,098 | Haase et al. | Aug. 20, 1935 |
| 2,137,214 | Clayton | Nov. 15, 1938 |
| 2,144,251 | Bartholomew | Jan. 17, 1939 |
| 2,310,215 | Cline | Feb. 9, 1943 |